US012806552B2

(12) United States Patent
Grimoldi et al.

(10) Patent No.: US 12,806,552 B2
(45) Date of Patent: Nov. 24, 2026

(54) DEVICE FOR FORMING TURBULENCE IN A LIQUID, ESPECIALLY FOR SOLID/LIQUID MIXTURES

(71) Applicant: SAATI S.P.A., Appiano Gentile (IT)

(72) Inventors: Elisa Grimoldi, Appiano Gentile (IT); Carmine Lucignano, Appiano Gentile (IT); Paolo Canonico, Appiano Gentile (IT)

( * ) Notice: Subject to any disclaimer, the term of this patent is extended or adjusted under 35 U.S.C. 154(b) by 247 days.

(21) Appl. No.: 18/254,180

(22) PCT Filed: Feb. 14, 2022

(86) PCT No.: PCT/IB2022/051276

§ 371 (c)(1),
(2) Date: May 24, 2023

(87) PCT Pub. No.: WO2022/172233

PCT Pub. Date: Aug. 18, 2022

(65) Prior Publication Data

US 2024/0024804 A1 Jan. 25, 2024

(30) Foreign Application Priority Data

Feb. 15, 2021 (IT) ........................ 102021000003326

(51) Int. Cl.
*B01D 39/08* (2006.01)
*B01D 39/16* (2006.01)
*B01D 39/20* (2006.01)

(52) U.S. Cl.
CPC ....... *B01D 39/086* (2013.01); *B01D 39/1692* (2013.01); *B01D 39/2013* (2013.01);
(Continued)

(58) Field of Classification Search
CPC .... A47J 31/4496; A47J 31/06; A47J 31/0657; B01D 39/086; B01D 39/1692;
(Continued)

(56) References Cited

U.S. PATENT DOCUMENTS

| | | | | | |
|---|---|---|---|---|---|
| 3,765,537 | A * | 10/1973 | Rosenberg | B01D 39/083 210/493.1 |
| 5,028,328 | A * | 7/1991 | Long | A47J 31/446 426/77 |

(Continued)

FOREIGN PATENT DOCUMENTS

| | | | | | |
|---|---|---|---|---|---|
| DE | 19706523 | A1 | 8/1998 | |
| GB | 2251547 | A * | 7/1992 | A47J 27/21183 |
| WO | 80/01451 | A1 | 7/1980 | |

OTHER PUBLICATIONS

ISR: European Patent Office; Jan. 6, 2022.

*Primary Examiner* — Claire A Norris
(74) *Attorney, Agent, or Firm* — Patshegen IP; Moshe Pinchas

(57) ABSTRACT

A device for the formation of turbulence in a liquid, which comprises at least one support (5) of plastic material provided with through holes (6) and at least one woven fabric (7) of synthetic monofilament formed as a single body by co-molding on one face of said support (5). Compared to conventional devices, the device according to the invention offers the advantage of allowing the volume of foam formed on the liquid downstream of the support to be modulated.

9 Claims, 7 Drawing Sheets

(52) U.S. Cl.
CPC .. *B01D 2201/32* (2013.01); *B01D 2239/0654* (2013.01); *B01D 2239/1208* (2013.01); *B01D 2239/1233* (2013.01)

(58) Field of Classification Search
CPC .... B01D 2239/1233; B01D 2239/1216; B01D 2239/10; B01D 2239/0613; B01D 2201/32
USPC .......................................... 99/298; 210/435
See application file for complete search history.

(56) References Cited

U.S. PATENT DOCUMENTS

2016/0135635 A1 5/2016 Boniello
2020/0113369 A1 * 4/2020 Bardot .................... A47J 31/20

* cited by examiner

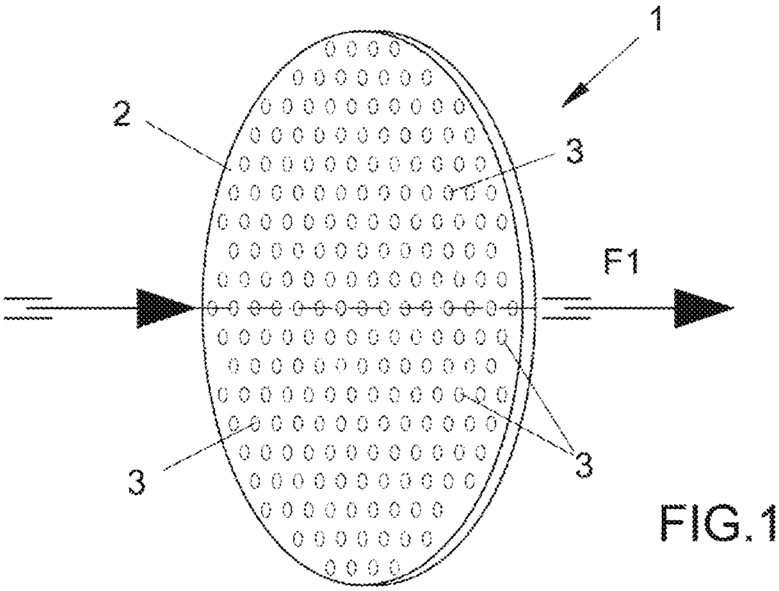
FIG.1 - Prior Art
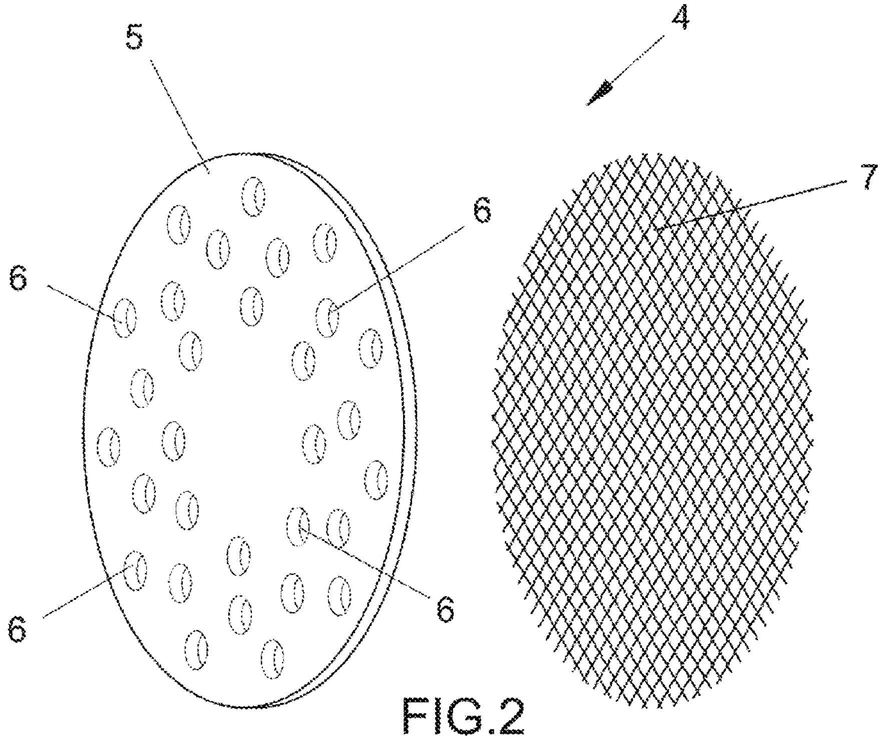
FIG.2

DEVICE FOR FORMING TURBULENCE IN A LIQUID, ESPECIALLY FOR SOLID/LIQUID MIXTURES

BACKGROUND OF THE INVENTION

The present invention relates to a device for forming turbulence in a liquid, starting from solid/liquid mixtures.

In the preparation of coffee, filters are used that carry out a solid/liquid separation, with the simultaneous creation of turbulence in the liquid that passes through the filter medium, so as to obtain a liquid filtrate on the surface of which there is a desired amount of foam. In these applications, the foam, which represents one of the fundamental parameters for determining good quality of the beverage, is generated by the turbulent motion of the liquid inside the holes of the filter used to retain the coffee powder.

In this type of machine, the water, usually brought to a pressure of 9 bar and a temperature of 90-95° C., is passed through a metal filter with very small holes that serve the purpose of retaining the finely ground coffee powder and forming, at the same time, an emulsion of gas and liquid during dispensing, thus forming the foam. The traditional filters used for this purpose are in particular constituted by a perforated metal disc of variable size, provided with circular holes having a diameter of between 250 and 300 microns, arranged regularly on the surface of the metal disc so that the open area, i.e. the total perforated surface of the disc, has a value of between 3% and 5% of the total surface of the latter. In this way, a beverage is obtained which, as it leaves the filter, has a surface layer of foam, formed by the dispersion of gas (air), during the stage of the liquid phase passing through the filter.

The main drawback of the filters described above is represented by the small size of the holes, in the order of microns, required to retain the coffee powder and yet responsible for a limited turbulence and therefore also for the formation of foam, on the liquid downstream of the filter, the amount of which depends on the size of the holes in the metal disc forming the filter.

A further drawback of the aforementioned prior art products is represented by the need to produce the filters with metal material, the only material capable of combining mechanical resistance to the pressure of the liquid passing through it with the presence of numerous holes in its surface, required to retain the coffee powder.

Conventional filters of the type in question therefore have a structure that does not allow them to control the volume of the foam formed downstream of the filter, which is in fact closely related to the number and size of the holes present in the surface of the latter, in turn linked to the small size of the coffee powder that has to be retained by the filter.

DE 197 06 523 A1 concerns a filter for beverages, consisting of a metal plate detachably coupled to a filter, also made of metal or plastic material.

US 2020/113369 A1 illustrates a filter for beverages consisting of a steel filter enclosed between two perforated plates.

US 2016/135635 A1 describes a filter formed by a filtering plate held on a perforated disc by means of a corresponding support plate.

SUMMARY OF THE INVENTION

The main object of the present invention is therefore to provide a device for forming turbulence in a liquid, starting from solid/liquid mixtures, which allows the formation of turbulence and therefore also of foam on the liquid passing through the device to be controlled, independently of its function of retaining the powder material, so as to obtain foam volumes even higher than those achievable with the filters of the prior art.

This and other objects are achieved by the device of claim 1. Preferred embodiments of the invention will be apparent from the remaining claims.

In comparison with conventional systems for the formation of foams in a liquid phase, thanks to the structure of the synthetic monofilament woven fabric, incorporated or embedded in the thickness of the perforated plastic material support, the positioning of the woven fabric meshes with respect to the holes in the support, and therefore the openings for formation of the turbulence are kept uniform and constant over the entire surface through which the liquid phase passes.

The invention also offers the advantage of allowing the volume of foam formed downstream of the filter to be modulated, in particular without compromising the ability of the filter to effectively retain the powder material in solid/liquid mixtures.

BRIEF DESCRIPTION OF THE DRAWINGS

These and other objects, advantages and characteristics result from the following description of some preferred embodiments of the device of the invention illustrated, by way of non-limiting examples, in the figures of the attached drawing sheets.

In these:

FIG. 1 is a perspective view of a conventional filter used in espresso coffee machines;

FIGS. 2 and 3 illustrate in exploded and section views, respectively, a first embodiment of the device of the invention;

DESCRIPTION OF THE PREFERRED EMBODIMENTS

The prior art filter illustrated in FIG. 1 consists of a metal disc 2 having holes 3 which, being dedicated to the function of retaining the coffee powder, have a very small diameter, usually of between 250 and 300 microns.

Due to the presence of the holes 3, the water that passes through the filter 1 is subjected to turbulence which, on the flow F1 downstream of the latter, generates the formation of a foam on the liquid filtrate. However, the small size of the holes 3, required to retain the coffee powder, does not allow modulation of the amount of foam formed on the surface of the liquid phase that passes through the filter 1.

Furthermore, the very presence of numerous small holes 3, combined with the pressure of the liquid that passes through them, requires the use of a metal material, the only material capable of offering the required mechanical strength, but also more expensive and more difficult to work with than other materials, such as plastic materials.

In order to modulate the formation of foam on the liquid filtrate, while leaving unaltered the necessary function of retaining the solid phase, the device of the invention illustrated in FIGS. 2 to 5 has been produced.

Figure 3:
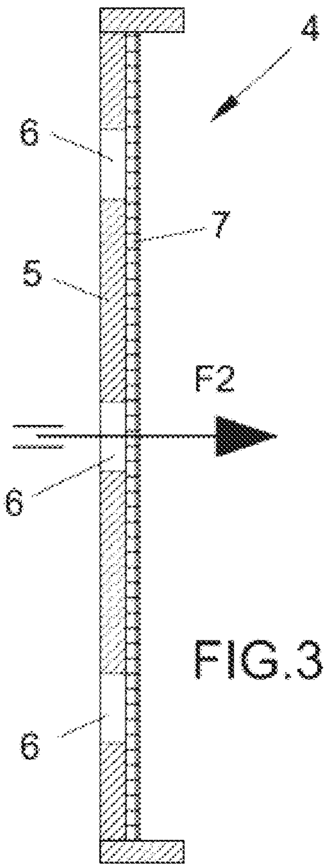
Figure 4:
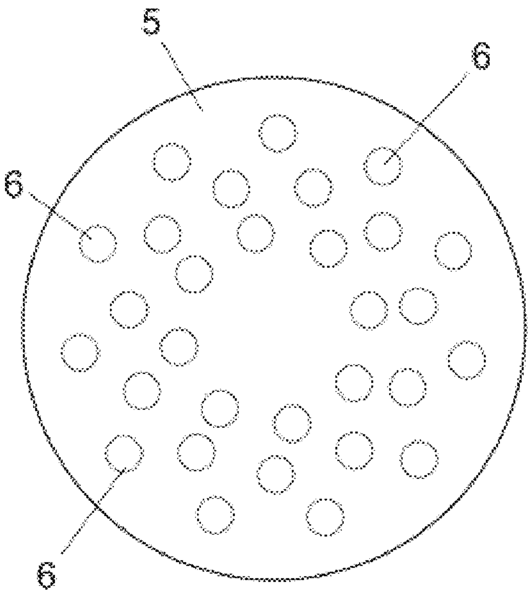
FIGS. 4 and 5 illustrate the perforated disc and the woven fabric, respectively, forming the device of FIGS. 2 and 3.
Figure 5:
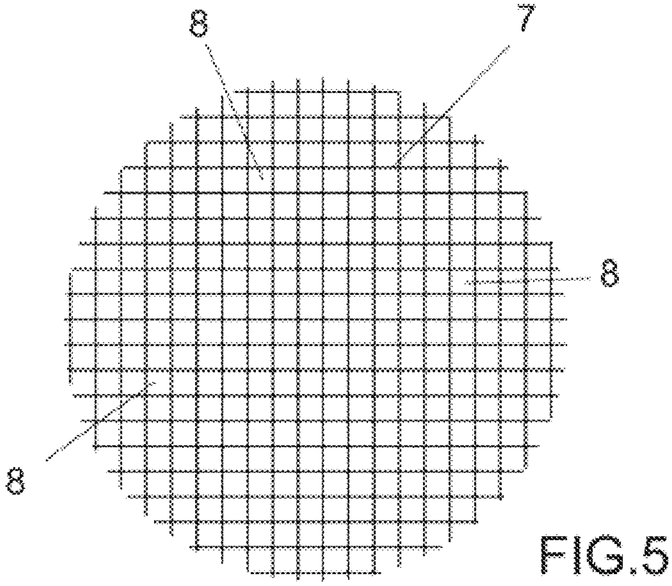

This device, indicated as a whole with reference number 4 in FIGS. 2 and 3, consists of a support 5 of rigid material, preferably a disc of injection-moldable plastic material, having a plurality of through holes 6. According to the invention, moreover, attached by co-molding on a surface or face of the support 5 is a synthetic monofilament woven fabric 7, which represents the component of the device 4 with the function of retaining the solid phase and whose meshes 8 are sized on the basis of the corresponding dimensions of the latter (FIG. 5).

In the co-molding operation, the molten polymer forming the support 5 is injected under pressure on the woven fabric 7, leaving open the areas of the woven fabric which are located in correspondence with the holes 6 of the support and through which the liquid to be subjected to the formation of turbulence is passed. In this way, the woven fabric 7 is incorporated into the thickness of the support 5, preferably close to one of its faces, substantially forming a single body.

For its part, the support 5 performs a function of supporting the woven fabric 7, also lowering the open area (meaning the percentage of open surface of the meshes 8 on the total surface area of the woven fabric) of the latter.

Figure 6:
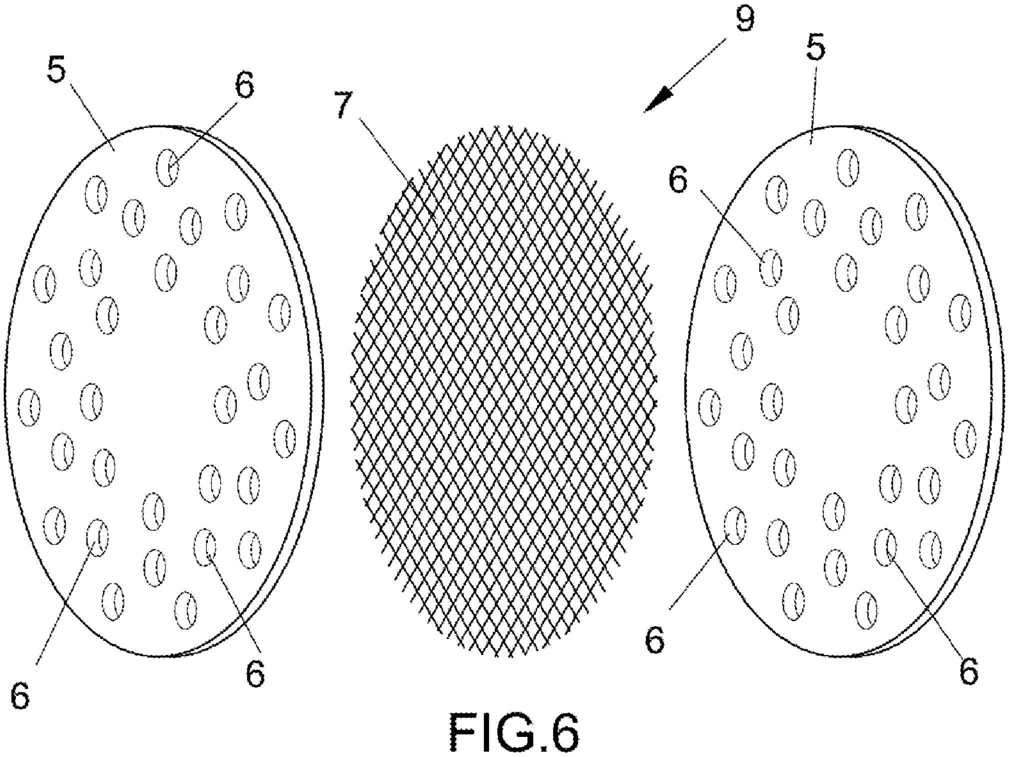
FIGS. 6 and 7 illustrate in exploded and section views, respectively, a variant of the device of FIGS. 2 and 3.
Figure 7:
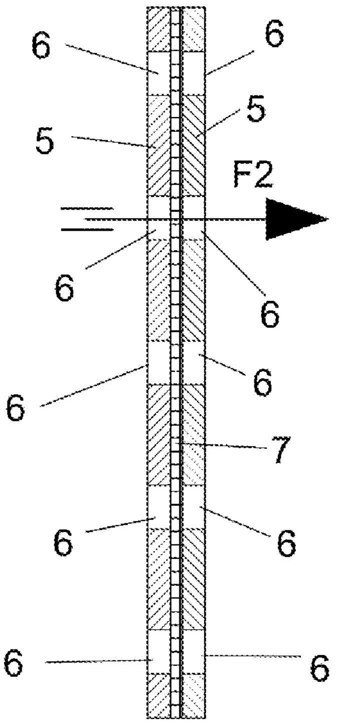

In the variant 9 of the device of the invention illustrated in FIGS. 6 and 7, the synthetic monofilament woven fabric 7 is fixed, on both faces, to a respective rigid support 5, similar to that described for the device 4 in FIG. 2 and whose function is to increase the stability of the device as a whole. In this embodiment the supports 5 are fixed, on the opposite faces of the woven fabric 7, maintaining the alignment between the respective holes 6 in the transverse direction of the filter, or of said supports, necessary for passage of the liquid filtrate.

As illustrated in FIGS. 3 and 7, the holes 6 of the support 5 upstream of the woven fabric 7 direct the flow F2 of the liquid/solid mixture towards the latter, generating turbulence which, in turn, determines the formation of a foam on the filtrate discharged downstream of the woven fabric 7.

Figure 6A:
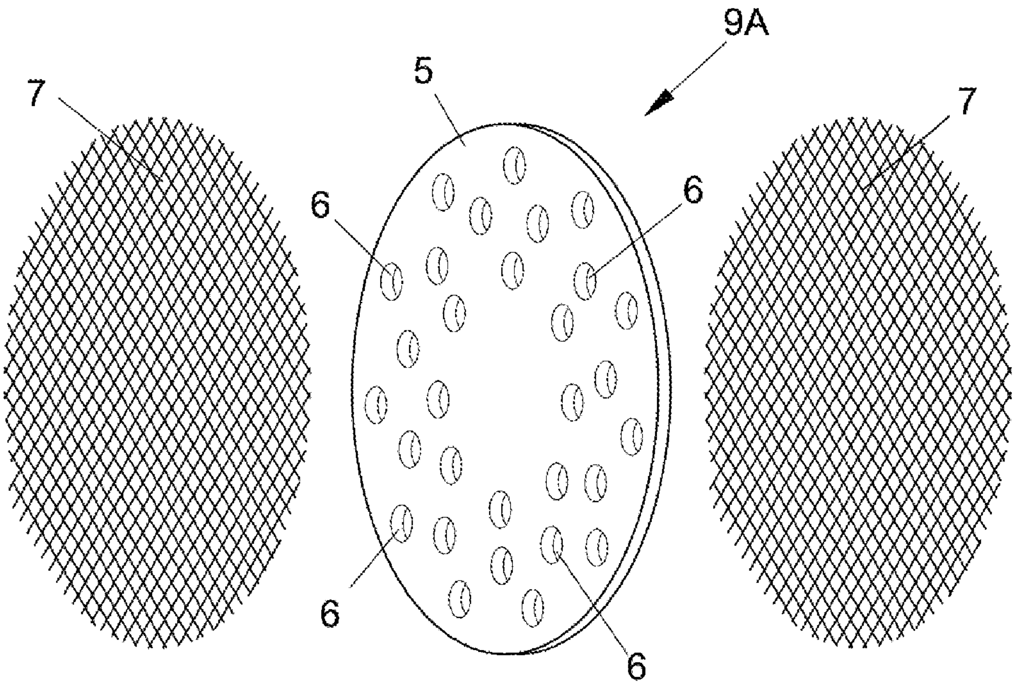
FIGS. 6A and 7A illustrate in exploded and section views, respectively, a further variant of the device of FIGS. 2 and 3.
Figure 7A:
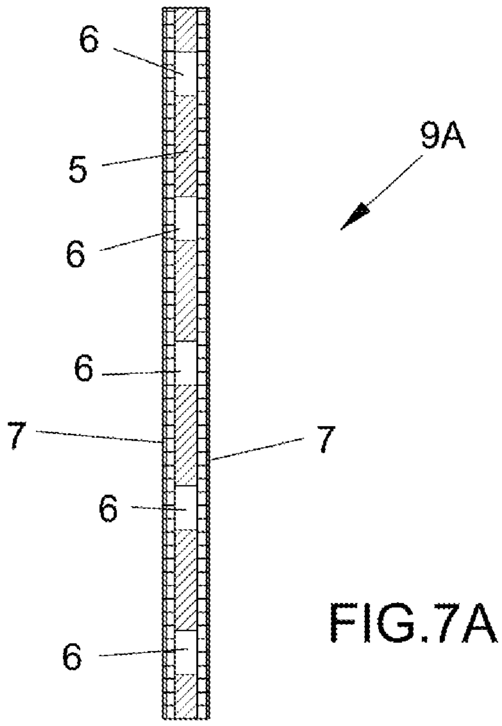

In the variant 9A of the filter of the invention, as illustrated in FIGS. 6A and 7A, the synthetic monofilament woven fabric 7 is fixed on both faces of the same rigid support 5.

Preferred examples of monofilament woven fabrics suitable for the invention are polyester or polyamide woven fabrics, of the 20.200 type (20 threads/cm with a diameter of 200 μm), 24.160 type, 29.145 type, with mesh opening value (i.e. the distance between contiguous weft and warp threads) of between 10 microns and 400 microns, thus forming an open area of between 10 and 50%. In particular, monofilament woven fabrics with 10 to 250 threads/cm, diameter of the threads from 19 to 200 microns and a mesh opening from 10 to 400 microns are suitable for the invention.

Examples of materials suitable for the support 5 are polyamide resins, possibly glass-filled, Triton®, Ultem®, Peek® polysulfone or polyether sulfone, with holes 6 having a diameter of between 0.5 and 6 mm.

From the described composition of support 5 and woven fabric 7, the filter of the invention has total open area values of between 0.2 and 10%, suitable for the formation of foam on the liquid filtrate as it leaves the device of the invention.

Figure 8:
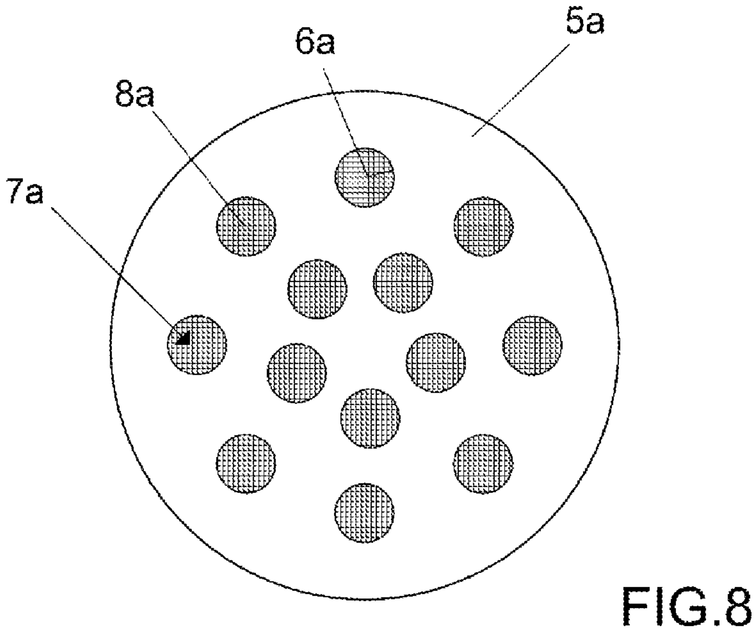
FIGS. 8 and 9 illustrate the device of the invention with a different dimensional combination of the meshes of the woven fabric and the holes of the disc.
Figure 9:
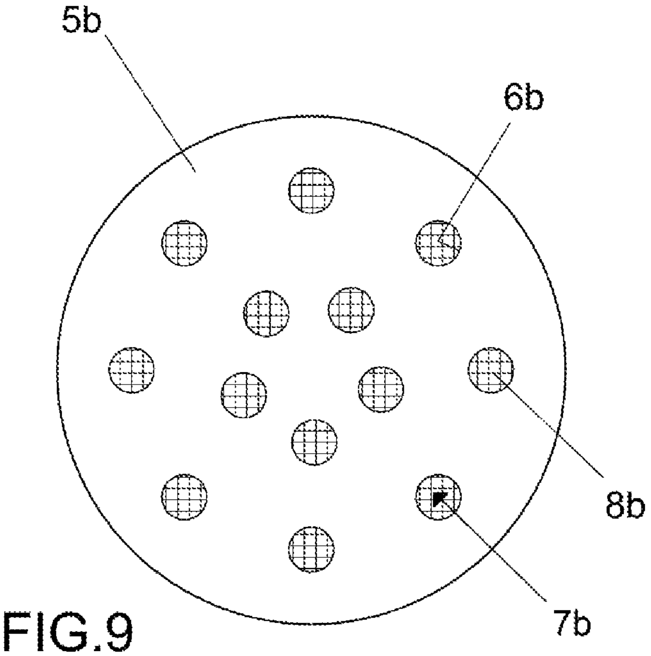

As shown in FIGS. 8 and 9, the same total open area value can be achieved:

- either with a support 5*a* provided with holes 6*a* of large diameter, for example of between 2 and 4.5 mm, in combination with a woven fabric 7*a* with meshes 8*a* having a low mesh opening, for example of between 35 and 45 microns, so as to have a device with a total open area of between 0.2 and 10% (FIG. 8);
- or with a support 5*b* provided with holes 6*b* of small diameter, for example of between 1 and 3 mm, in combination with a woven fabric 7*b* with meshes 8*b* having a high mesh opening, for example of between 200 and 300 microns, so as to form a device with a total open area of between 0.2 and 10% (FIG. 9).

In this way it is possible to modulate the speed of passing through a single mesh of the woven fabric and, consequently, also the turbulence of the flow of liquid as it leaves the device. In fact, once the total open area of the device of the invention, meaning the percentage of the area available for passage of the liquid through the holes 6 of the rigid support 5 and through the meshes 8 of the woven fabric 7, has been fixed or pre-established with respect to the total surface area of the same support 5, the turbulence in the liquid filtrate will be given by the speed of passing through a single mesh 8 and by the size of the opening of the woven fabric 7. Thus, for example, a total open area of 8% means that, on 100 $mm^2$ of the surface of the support 5, 8 $mm^2$ is the surface area available for passage of the liquid through the holes of the rigid support 5 and of the meshes of the woven fabric 7.

Figure 10:
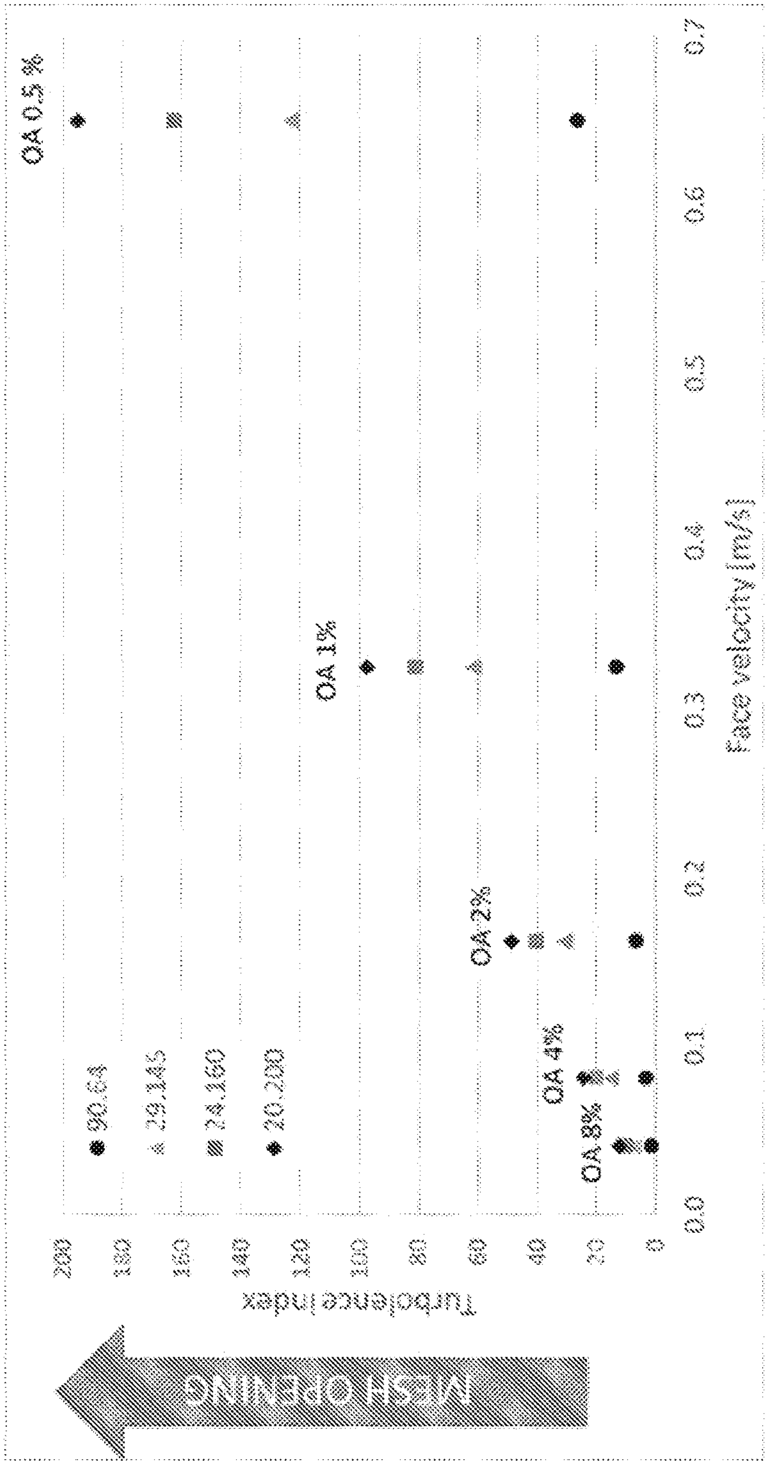
FIG. 10 illustrates the trend of the turbulence index in the device of the invention, as a function of its face velocity.

FIG. 10 shows the trend of the turbulence index of the liquid filtrate, calculated as the speed of passing through the device 4,9,9A (face velocity) multiplied by the mesh opening of the woven fabric, as a function of the face velocity of woven fabric 90.64, 29.145, 24.160, and 20.200, calculated for an Open Area (OA) of 8%, 4%, 2%, 1%, and 0.5%, respectively.

From an examination of this figure, it will be seen that the higher the face velocity, the higher the turbulence index. Furthermore, the rise of this index increases as the value of the mesh opening of the woven fabric increases.

Figure 11:
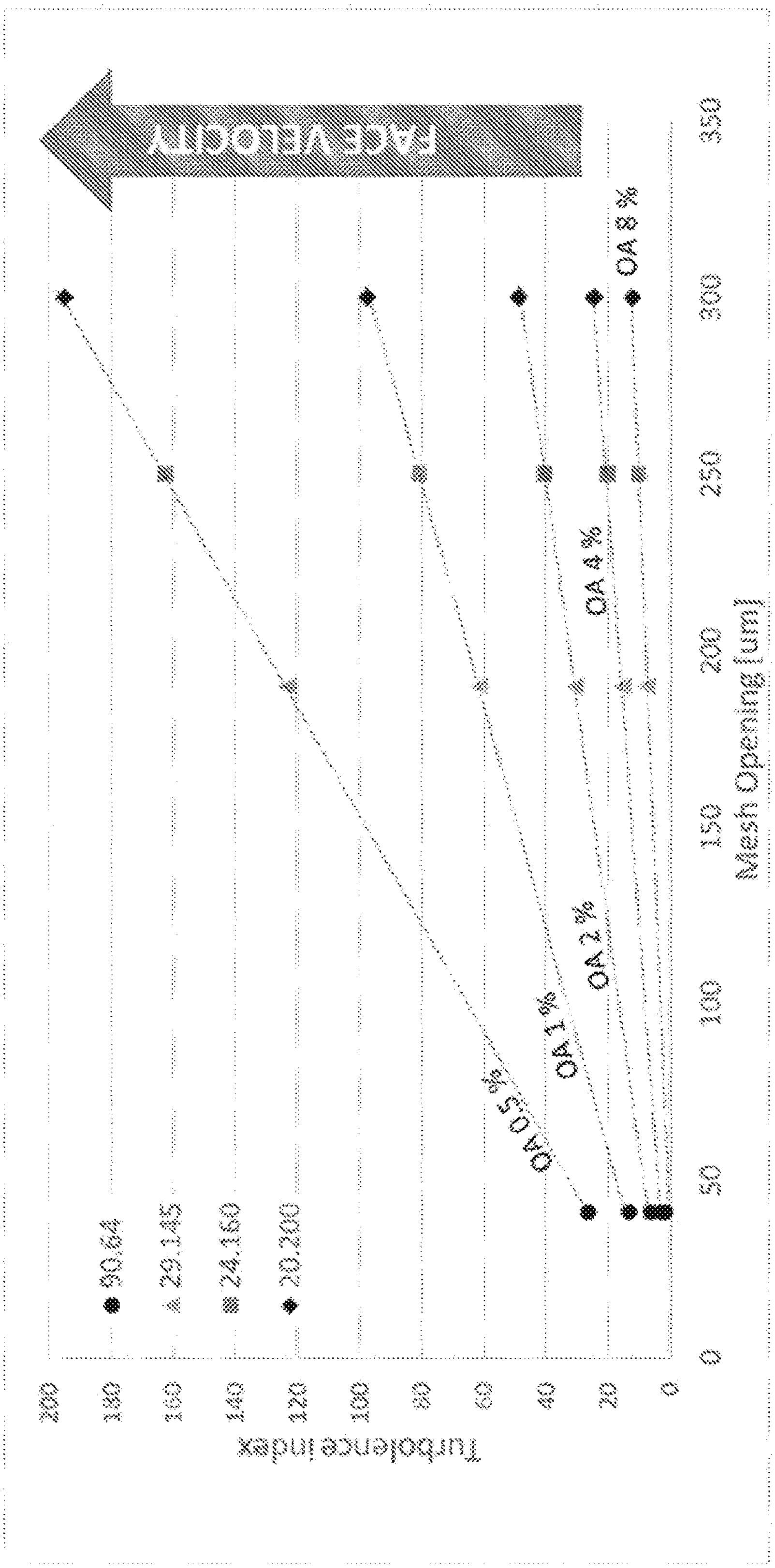
FIG. 11 illustrates the trend of the turbulence index in the device of the invention, as a function of the fabric mesh opening.

FIG. 11 shows the trend of the turbulence index as a function of the mesh opening. From this figure we can see the increase in the turbulence index with the mesh opening of the woven fabric and with the Open Area of the device.

Solid/liquid mixtures can be treated with the device of the invention, such as for example mixtures for the preparation of coffee, characterized by the need to create turbulence.

The invention will now be described with reference to the following examples.

Comparative Example

Filter with Open Area of 4% (Prior Art)

A solid/liquid mixture is prepared, consisting of coffee powder in water.

To separate the solid particles from the liquid phase, a filter is used consisting of a metal disc having an area of 615 $mm^2$ and 50 holes/$cm^2$ with a diameter of 300 microns, corresponding to an Open Area (OA) of the filter of 4%. Given a face velocity of 0.00325 m/s, meaning the speed of the water passing through the filter, calculated on the delivery of a volume of 30 ml of liquid filtrate in a time of 15 s (face velocity=volume of liquid/filter surface×time), the speed of passing through the single holes of the metal disc will be 0.081 m/s (face velocity/OA) and the turbulence index (given by this speed of passing through multiplied by the diameter of the filter holes) will be 20.31 (0.081 m/s×300 μm). In this way a liquid filtrate is obtained containing about 16% of foam on the total volume.

Example 1

Device with a Total Open Area of 4%

The solid/liquid mixture of the previous example is passed through the device of the invention, comprising a synthetic monofilament woven fabric 7, having 24 threads/cm with a diameter of 160 microns, a mesh opening of 250 microns and an open area of 37%. The woven fabric 7 is fixed by co-molding (i.e. by injection molding a support disc 5 of perforated plastic material, which has a synthetic monofilament woven fabric disc incorporated in its thickness, preferably arranged close to one of its faces) to a support 5 of glass-filled polyamide, having a discoidal shape with an area of 615 $mm^2$ and 24 holes with diameter 1.88 mm.

Overall, the total Open Area of the device of the invention has a value of 4%. Given a face velocity of 0.00325 m/s, meaning the speed of passing through the device by a volume of 30 ml of liquid filtrate in a time of 15 s, according to the calculation method indicated in the previous comparative example, the speed of passing through a single mesh 8 of the woven fabric 7 will be 0.081 m/s (calculated as in the comparative example) and the turbulence index (given by this speed of passing through multiplied by the woven fabric mesh opening value) will be 20.31 (calculated as in the comparative example). In this way a liquid filtrate is obtained containing about 16% of foam on the total volume. The device of the invention therefore allows the desired turbulence index to be reached, with a considerably lower number of holes in the support disc than the number that has to be provided in the prior art metal disc.

Example 2

Device with a Total Open Area of 4%

The solid/liquid mixture of the comparative example is filtered with the device of the invention prepared with a synthetic monofilament woven fabric 7, having 20 threads/cm with a diameter of 200 microns, and having a mesh opening of 300 microns and an open area of 35%. The woven fabric 7 is fixed by co-molding on the surface of the support 5 of Example 1, with a discoidal shape having an area of 615 $mm^2$ and 24 holes with a diameter of 1.93 mm. Overall, the total open area of the device of the invention has a value of 4%. Given a face velocity of 0.00325 m/s, as calculated according to Example 1, the speed of passing through a single mesh 8 of the woven fabric 7 will be again 0.081 m/s, but this time with a turbulence index of 24.37. Therefore, with the same dimensions of disc 5 and the same total open area, the device of Example 2 produces a greater turbulence and therefore a greater amount of foam (approximately 18%) than the device of Example 1.

Example 3

Device with a Total Open Area of 2%

The solid/liquid mixture of the comparative example is treated in the device of the invention prepared starting from a synthetic monofilament woven fabric 7 according to Example 1, fixed by co-molding on the surface of a support 5 having a discoidal shape with an area of 615 $mm^2$ and 24 holes with a diameter of 1.33 mm. Overall, the total open area of the device of the invention has a value of 2%. Given a face velocity of 0.00325 m/s, as calculated according to Example 1, the speed of passing through a single mesh 8 of the woven fabric 7 will be 0.162 m/s, thus producing a turbulence index of 40.62 and a foam of approximately 20% volume. The greater turbulence on the liquid filtrate as it leaves the device according to this example, compared to Example 1, was therefore achieved through a reduction of the open area from 4% to 2%, in turn obtained by using a disc 5 provided with smaller holes.

Example 4

Device with a Total Open Area of 2%

The solid/liquid mixture of the comparative example is passed through the device of the invention prepared with a synthetic monofilament woven fabric 7 having 20 threads/cm with a diameter of 200 microns, having a mesh opening of 300 microns and an open area of 35%, fixed by co-molding on the surface of a support 5 having a discoidal shape with an area of 615 $mm^2$ and 24 holes with a diameter of 1.37 mm. Overall, the total open area of the device of the invention has a value of 2%. Given a face velocity of 0.00325 m/s, as calculated according to Example 1, the speed of passing through a single mesh 8 of the woven fabric 7 will be 0.162 m/s, thus producing a turbulence index of 48.75 and a foam of approximately 25% volume. The device according to this example therefore allows a higher turbulence index to be obtained than that of Example 3, with a same total open area value.

The results of the previous examples have been collected in the following table:

| Example | Total open area | Woven fabric Mesh opening Open Area | Disc Number of holes | Disc Hole diameter | Speed of passing through [m/s] | Turbulence (index) |
|---|---|---|---|---|---|---|
| Comparative example (prior art) | 4% | NA | 50 holes/$cm^2$ distributed over the entire available surface | 300 μm | 0.081 | 20.31 |
| 1 | 4% | 250 μm 37% | 24 | 1.88 mm | 0.081 | 20.31 |
| 2 | 4% | 300 μm 35% | 24 | 1.93 mm | 0.081 | 24.37 |
| 3 | 2% | 250 μm 37% | 24 | 1.33 mm | 0.162 | 40.62 |
| 4 | 2% | 300 μm 35% | 24 | 1.37 mm | 0.162 | 48.75 |

Changes may be made to the invention as described above and illustrated in the figures of the attached drawing sheets, in order to produce variants which still fall within the scope of the appended claims.

Thus, for example, the number of holes in the disc could be decreased, in order to correspondingly decrease the open area value of the device. The device of Example 4 could also be modified, by reducing the number of holes in the disc from 24 to 6 and bringing the Open Area of the device from 2% to 0.5%, with an increase in the turbulence index from 48.75 to 195.

The invention claimed is:

1. Device for forming turbulence in a liquid from solid/liquid mixtures, the device comprising:

at least one support (5) including a disc made of plastic polymer and provided with through holes (6) with a diameter of between 0.5 and 6 mm; and, at least one woven fabric (7) of synthetic monofilament formed as a mesh;

wherein said at least one woven fabric (7) is incorporated in the thickness of said support (5) and thereby a portion of said at least one woven fabric (7) is disposed inside said holes (6) and wherein said at least one support (5) is formed by injecting said plastic polymer, under pressure on said at least one woven fabric (7), such that areas of the at least one woven fabric (7) which are located inside the holes (6) of the at least one support (5) form openings which are kept uniform and constant over the entire surface of said device through which the liquid phase passes, and wherein the openings have a total open area values of between 0.2 and 10% with respect to the area of said at least one support (5), suitable for the formation of foam on liquid filtrate as it leaves said device.

2. Device according to claim 1, wherein said synthetic monofilament is made of polyester or polyamide.

3. Device according to claim 1, wherein said at least one support includes a first and a second supports (5), and wherein a first face of said at least one woven fabric is incorporated in the thickness of said first support and second face of said at least one woven fabric is incorporated in the thickness of said second support, and wherein said first and a second supports (5) are arranged such that the holes (6) of said first support are aligned with the holes (6) of said second support.

4. Device according to claim 1, wherein said at least one woven fabric (7) includes two woven fabrics each of which is arranged on one face of said at least one support (5).

5. Device according to claim 2, wherein said at least one woven fabric (7) is a monofilament woven fabric with a mesh opening value of between 10 and 400 microns.

6. Device according to claim 5, wherein said at least one woven fabric (7) is a monofilament woven fabric with 10 to 250 threads/cm, thread diameter from 19 to 200 microns and a mesh opening from 10 to 400 microns.

7. Device according to claim 3 wherein said total open area of said device represents the percentage of the area available for passage of the liquid through said holes (6) of the first and second supports (5) and said at least one woven fabric (7).

8. Device according to claim 1, wherein the diameter of the holes (6) is between 2 and 4.5 mm and wherein the at least one woven fabric (7) has mesh opening of between 35 and 45 microns.

9. Device according to claim 1, wherein the diameter of the holes (6) is between 1 and 3 mm and wherein the at least one woven fabric (7) has mesh opening of between 200 and 300 microns.

* * * * *